United States Patent
Liu et al.

(10) Patent No.: US 12,495,426 B2
(45) Date of Patent: Dec. 9, 2025

(54) BEAM ALIGNMENT METHOD AND APPARATUS

(71) Applicant: Huawei Technologies Co., Ltd., Shenzhen (CN)

(72) Inventors: Qiao Liu, Chengdu (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 469 days.

(21) Appl. No.: 17/966,506

(22) Filed: Oct. 14, 2022

(65) Prior Publication Data

US 2023/0034327 A1    Feb. 2, 2023

Related U.S. Application Data

(63) Continuation of application No. PCT/CN2021/084588, filed on Mar. 31, 2021.

(30) Foreign Application Priority Data

Apr. 16, 2020  (CN) .......................... 202010299220.4

(51) Int. Cl.
*H04W 16/28*    (2009.01)
*H04W 24/10*    (2009.01)
*H04W 72/23*    (2023.01)

(52) U.S. Cl.
CPC ........... *H04W 72/23* (2023.01); *H04W 16/28* (2013.01); *H04W 24/10* (2013.01)

(58) Field of Classification Search
CPC ..... H04B 7/0695; H04B 7/088; H04W 16/28; H04W 24/10; H04W 72/04; H04W 72/54
See application file for complete search history.

(56) References Cited

U.S. PATENT DOCUMENTS

2017/0279504 A1* 9/2017 Chen ................... H04B 7/0413
2019/0327618 A1  10/2019 Li et al.
2020/0212978 A1* 7/2020 Zhao .................... H04B 7/0469

FOREIGN PATENT DOCUMENTS

| CN | 101291164 A |   | 10/2008 |           |
|----|-------------|---|---------|-----------|
| CN | 108988914 A |   | 12/2018 |           |
| CN | 109660284 A |   | 4/2019  |           |
| CN | 109936397 A | * | 6/2019  |           |
| CN | 111106858 A | * | 5/2020  | H04B 5/79 |

* cited by examiner

Primary Examiner — Derrick V Rose
(74) Attorney, Agent, or Firm — Slater Matsil, LLP

(57) ABSTRACT

A network device receives a first uplink signal from a terminal device; the network device calculates a conjugate phase corresponding to the first uplink signal, and determines, based on the conjugate phase, a narrow beam whose direction of arrival is opposite to a direction of arrival of the first uplink signal as a target transmit beam aligned between the network device and the terminal device; and the network device communicates with the terminal device by using the target transmit beam.

20 Claims, 9 Drawing Sheets

BEAM ALIGNMENT METHOD AND APPARATUS

CROSS-REFERENCE TO RELATED APPLICATIONS

This application is a continuation of International Application No. PCT/CN2021/084588, filed on Mar. 31, 2021, which claims priority to Chinese Patent Application No. 202010299220.4, filed on Apr. 16, 2020. The disclosures of the aforementioned applications are hereby incorporated by reference in their entireties.

TECHNICAL FIELD

This application relates to the field of communication technologies, and in particular, to a beam alignment method and apparatus.

BACKGROUND

The 3rd Generation Partnership Project (3GPP) incorporates a millimeter wave band with sufficient spectrum resources into a 5th generation (5G) cellular communication system standard, to meet a requirement of a user for high-speed communication. However, the millimeter wave signal suffers from severe path loss and penetration loss during propagation due to a high frequency and a short wavelength of the millimeter wave signal In addition, in a high-speed moving scenario, because coherence time of a millimeter wave signal is excessively short, a large Doppler spread greatly restricts mobility of the user. The 5G system has both of high mobility and a high data rate. This poses an important challenge to the application of a millimeter wave in the 5G system. In addition, the 5G system has a disadvantage of poor mobility on a high frequency channel. Because communication link quality rapidly deteriorates due to reasons such as user equipment (UE) movement, UE rotation, or path blocking. As a result, access and handover reliability are reduced, and user mobility experience is affected.

Currently, to overcome a problem of severe attenuation of received signal strength caused by a path loss, a beamforming technology needs to be used for a millimeter wave to ensure link transmission quality. Beamforming derives from a concept of an adaptive antenna and can be classified into beamforming at a transmit end and beamforming at a receive end. The beamforming technology adjusts phases of antennas, so that signals are effectively superimposed, radio signal energy is focused, a directional beam is formed, and an obvious signal gain is generated to overcome a path loss. Therefore, the beamforming technology fundamentally ensures 5G radio signal transmission quality. A narrower beam indicates a higher signal gain. However, once a beam direction of a base station deviates from a user terminal, the user terminal cannot receive a high-quality radio signal. Therefore, how to quickly align a beam with a user becomes an urgent problem to be resolved in the 5G system.

SUMMARY

This application provides a beam alignment method and apparatus, to implement fast beam alignment, and automatically calibrate multipath effect generated by a building or a tree.

According to a first aspect, a beam alignment method is provided. The method may be applied to a first communication apparatus. The first communication apparatus may be a network device, or a chip or a chipset in the network device. The method includes: A network device receives a first uplink signal from a terminal device; the network device calculates a conjugate phase corresponding to the first uplink signal; and the network device determines, based on the conjugate phase, a narrow beam whose direction of arrival is opposite to a direction of arrival of the first uplink signal as a target transmit beam aligned between the network device and the terminal device.

In this embodiment of this application, beam sweeping behavior of a base station and a terminal can be constrained by using the foregoing method, so that the beam sweeping behavior of the base station and the terminal can be aligned. Therefore, a quantity of beam sweeping times and time for beam alignment are reduced, a beamforming convergence rate is improved, and beamforming precision is improved.

In a possible design, the network device may further receive a second uplink signal from the terminal device, where the second uplink signal includes a measurement result of a target receive beam of the terminal device or an identifier of the target receive beam of the terminal device; and the network device determines, based on the second uplink signal, a target downlink receive beam aligned with the target downlink transmit beam.

In this embodiment of this application, precise pairing of the target downlink transmit beam and the target downlink receive beam can be implemented by using the foregoing method.

In a possible design, before the network device receives the first uplink signal from the terminal device, the network device may further transmit a radio signal to the terminal device by using fixed wide beams pointing to different directions, where a set of directions of the fixed wide beams pointing to different directions covers a signal coverage area of the network device. In this embodiment of this application, the base station may complete wide beam alignment by using a sweeping process.

In a possible design, the network device may include a conjugate phase processing apparatus, where the conjugate phase processing apparatus can construct an array system with a beam reverse directionality function. Specifically, the conjugate phase processing apparatus of the network device may calculate, based on the direction of arrival of the first uplink signal, the conjugate phase corresponding to the first uplink signal. In this embodiment of this application, calculating the conjugate phase corresponding to the first uplink signal does not require prior AOA information or channel estimation information, and does not require pilot overheads. In addition, an entire process is irrelevant to a frequency. Calculation in a direction of arrival can be implemented in an analog domain, which is easy to implement and has a short delay.

In a possible design, after the network device communicates with the terminal device by using the target beam, the network device may further calculate, based on a third uplink signal from the terminal device, a conjugate phase corresponding to the third uplink signal; and the network device adjusts, based on the conjugate phase corresponding to the third uplink signal, the target downlink transmit beam to a narrow beam whose direction of arrival is opposite to a direction of arrival of the third uplink signal. In this embodiment of this application, when UE moves, the base station may implement automatic beam tracking and alignment by using the foregoing method.

According to a second aspect, an embodiment of this application provides a beam alignment method, where the method may be applied to a second communication apparatus, and the second communication apparatus may be a terminal device, or a chip or a chipset in the terminal device. The method includes: A terminal device receives a first downlink signal from a network device; the terminal device calculates a conjugate phase corresponding to the first downlink signal; the terminal device determines, based on the conjugate phase, a narrow beam whose direction of arrival is opposite to a direction of arrival of the first downlink signal as a target uplink transmit beam of the terminal device; and the terminal device communicates with the network device by using the target uplink transmit beam.

In this embodiment of this application, beam sweeping behavior of a base station and a terminal can be constrained by using the foregoing method, so that the beam sweeping behavior of the base station and the terminal can be aligned. Therefore, a quantity of beam sweeping times and time for beam alignment are reduced, a beamforming convergence rate is improved, and beamforming precision is improved.

In a possible design, the terminal device may further receive a second downlink signal from the network device, where the second downlink signal includes a measurement result of a target receive beam of the network device or an identifier of the target receive beam of the network device; and the terminal device determines, based on the second downlink signal, a target uplink receive beam aligned with the target uplink transmit beam.

In this embodiment of this application, precise pairing of the target uplink transmit beam and the target uplink receive beam can be implemented by using the foregoing method.

In a possible design, before the terminal device receives the first downlink signal from the network device, the terminal device may further transmit a radio signal to the network device by using fixed wide beams pointing to different directions, where a set of directions of the fixed wide beams pointing to different directions covers a signal coverage area of the network device. In this embodiment of this application, the base station may complete wide beam alignment by using a sweeping process.

In a possible design, the terminal device may include a conjugate phase processing apparatus, where the conjugate phase processing apparatus can construct an array system with a beam reverse directionality function. Specifically, the conjugate phase processing apparatus of the terminal device may calculate, based on the direction of arrival of the first downlink signal, the conjugate phase corresponding to a reference signal. In this embodiment of this application, calculating the conjugate phase corresponding to the reference signal does not require prior AOA information or channel estimation information, and does not require pilot overheads. In addition, an entire process is irrelevant to a frequency. Calculation in a direction of arrival can be implemented in an analog domain, which is easy to implement and has a short delay.

In a possible design, after the network device communicates with the terminal device by using the target beam, the terminal device may further calculate, based on a third downlink signal from the network device, a conjugate phase corresponding to the third downlink signal; and the terminal device adjusts, based on the conjugate phase corresponding to the third downlink signal, the target uplink transmit beam to a narrow beam whose direction of arrival is opposite to a direction of arrival of the third downlink signal. In this embodiment of this application, when UE moves, the base station may implement automatic beam tracking and alignment by using the foregoing method.

According to a third aspect, this application provides a beam alignment apparatus. The apparatus may be a communication device, or may be a chip or a chipset in the communication device. The communication device may be a terminal device or a base station. The apparatus may include a processing module and a transceiver module. When the apparatus is the communication device, the processing module may be a processor, and the transceiver module may be a transceiver. The apparatus may further include a storage module, and the storage module may be a memory. The storage module is configured to store instructions, and the processing module executes the instructions stored in the storage module, to perform a corresponding function in the first aspect or perform a corresponding function in the second aspect. When the apparatus is a chip or a chip set in the communication device, the processing module may be a processor, and the transceiver module may be an input/output interface, a pin, a circuit, or the like. The processing module executes the instructions stored in the storage module, to perform a corresponding function in the first aspect or a corresponding function in the second aspect. The storage module may be a storage module (for example, a register or a cache) in the chip or the chipset, or may be a storage module (for example, a read-only memory or a random-access memory) that is in the base station and that is located outside the chip or the chipset.

According to a fourth aspect, a beam alignment apparatus is provided, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the method in any one of the first aspect or the designs of the first aspect, or any one of the second aspect or the designs of the second aspect.

According to a fifth aspect, an embodiment of this application provides a computer storage medium. The computer storage medium stores program instructions. When the program instructions are run on a communication device, the communication device is enabled to perform the method in any one of the first aspect and the possible designs of the first aspect, or any one of the second aspect and possible designs of the second aspect in embodiments of this application.

According to a sixth aspect, an embodiment of this application provides a computer program product. When the computer program product is run on a communication device, the communication device is enabled to perform the method in any one of the first aspect and possible designs of the first aspect, or any one of the second aspect and possible designs of the second aspect in embodiments of this application.

According to a seventh aspect, an embodiment of this application provides a chip, where the chip is coupled to a memory, to perform the method in any one of the first aspect and possible designs of the first aspect, or any one of the second aspect and possible designs of the second aspect in embodiments of this application.

According to an eighth aspect, an embodiment of this application provides a chip, including a communication interface and at least one processor, where the communication interface is configured to transmit information, a message, and/or data between the apparatus and another apparatus, and the processor runs program instructions to perform the method in any one of the first aspect or the designs of the first aspect, or any one of the second aspect and the possible designs in embodiments of this application.

DETAILED DESCRIPTION OF ILLUSTRATIVE EMBODIMENTS

Figure 1:
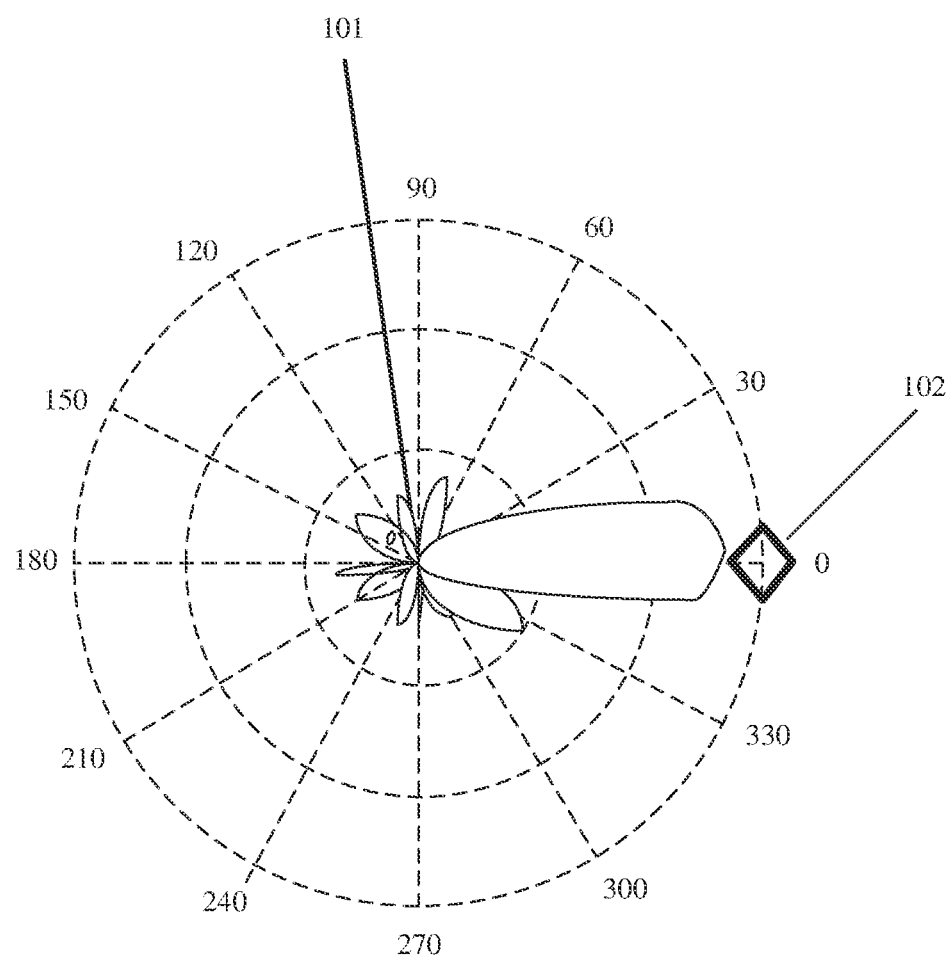
FIG. 1 is a schematic diagram of generating a directional beam through beamforming in a related technology according to an embodiment of this application.

To facilitate understanding of embodiments of this application, the following describes terms related to embodiments of this application.

1. Beam (beam): A beam is a communication resource. The beam may be a wide beam, a narrow beam, or a beam of another type. A technology for forming the beam may be a beamforming technology or another technology. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having a same communication feature or similar communication features may be considered as one beam. One beam may include one or more antenna ports, configured to transmit data channels, control channels, and sounding signals. For example, a transmit beam may be distribution of signal strength formed in different spatial directions after a signal is transmitted by using an antenna, and a receive beam may be distribution of signal strength that is formed in different spatial directions and that is of a radio signal received from the antenna. It may be understood that, one or more antenna ports forming one beam may also be considered as one antenna port set.

Beams may be classified into a transmit beam and a receive beam of a network device and a transmit beam and a receive beam of a terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal is used to describe receive-side beamforming information of the terminal device. In other words, the beam is used to describe beamforming information.

The beam may correspond to a time resource, a space resource, and/or a frequency domain resource. Optionally, the beam may further correspond to a reference signal (RS) resource (for example, a beamforming RS resource) or beamforming information.

Optionally, the beam may further correspond to information associated with an RS resource of a network device. The RS may be a channel state information reference signal (CSI-RS), a synchronization signal broadcast channel block (SS/PBCH block), which may also be referred to as an SSB, a demodulation reference signal (DMRS), a phase tracking reference signal (PTRS), a tracking reference signal (TRS), or the like. The information associated with the RS resource may be an RS resource identifier, quasi-collocation (QCL) information (especially QCL of type D), or the like. The RS resource identifier corresponds to a transmit/receive beam pair previously established during measurement based on the RS resource. The terminal may infer beam information based on an RS resource index.

Optionally, the beam may further correspond to a spatial domain filter (spatial filter or spatial domain filter) or a spatial domain transmission filter.

The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Information of a spatial relation parameter may be equivalent to a spatial filter (spatial domain transmission/receive filter). Optionally, the spatial filter generally includes a spatial transmit filter and a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

Currently, a high frequency band is added to 5G NR, for example, a frequency band of 28 GHz, 39 GHz, or 60 GHz. A higher bandwidth and a higher transmission rate can be achieved by introducing a high frequency. Because a frequency of a signal is high, the signal suffers from severe fading during spatial propagation. Therefore, 5G NR uses a beamforming (BF) technology to obtain a good directional gain, to increase directional power in a transmit direction and improve a signal to interference plus noise ratio (SINR) at a receive end. Therefore, system performance is further improved. Because both of a gNB and UE use a hybrid beamforming technology, a transmit/receive beam management problem caused by the hybrid beamforming technology becomes a central problem in a 5G NR standardization discussion process.

In a related technology, a base station using the beamforming technology needs to use a plurality of beams pointing to different directions to completely cover a cell. The base station needs to sequentially transmit a radio signal by using the beams pointing to different directions, and searches for an optimal transmit beam aligned with a user terminal in a manner of traversing and sweeping all beams. FIG. 1 is a schematic diagram of generating a directional beam by a base station through beamforming in a related technology. Refer to FIG. 1. A base station 101 adjusts phases of antennas by using a beamforming technology, so that signals are effectively superimposed, and radio signal energy is focused to form a directional beam, and the directional beam points to a user terminal 102.

Figure 2:
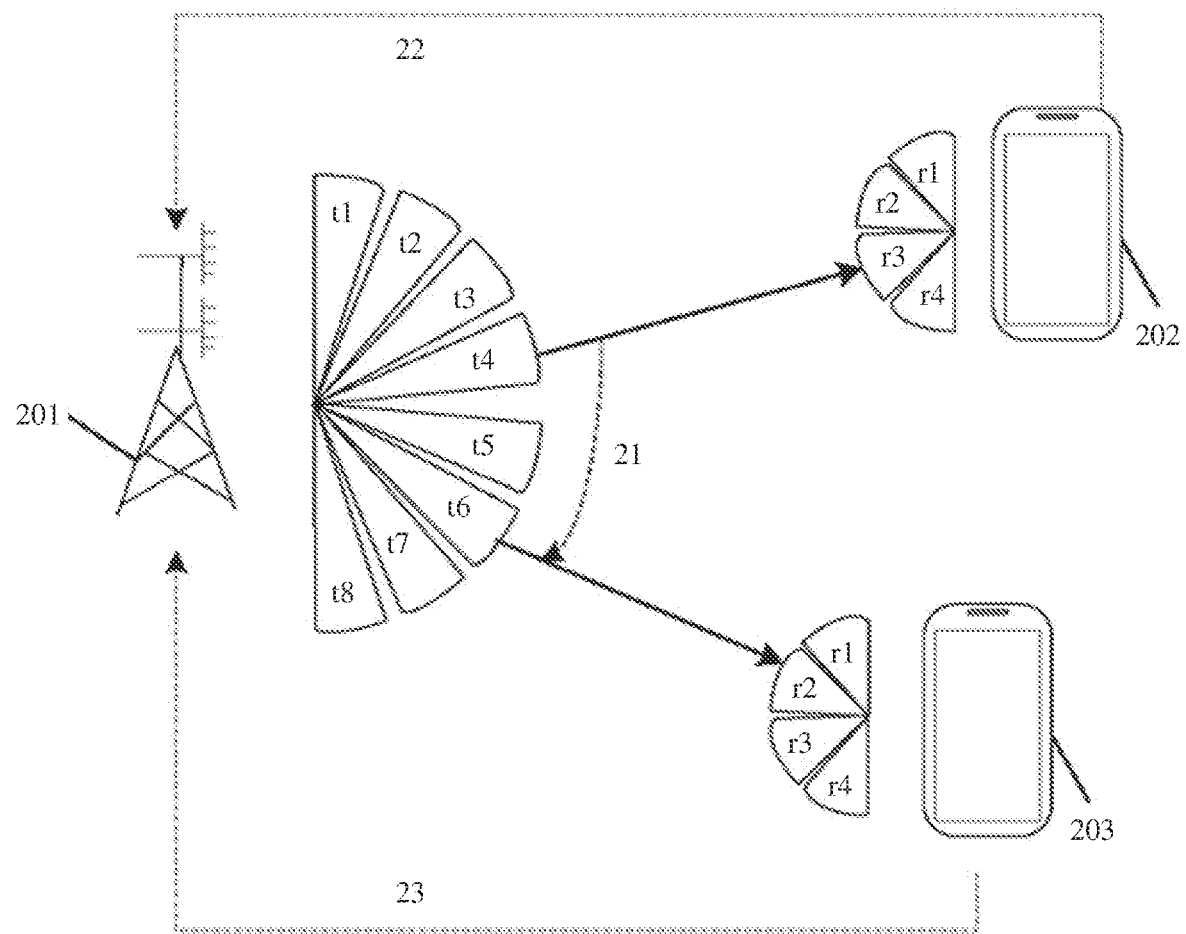
FIG. 2 is a schematic diagram of a principle of beam alignment in a related technology according to an embodiment of this application.

Beam training includes a transmit and receive beam sweeping process of the network device and the terminal device. An objective of the beam training is to search for a beam pair, and the beam pair includes one transmit beam and one receive beam. When a transmit beam direction and a receive beam direction are aligned, a receive signal gain is good. FIG. 2 is a schematic diagram of a principle of beam alignment in a related technology. Refer to FIG. 2. A 5G base station using beamforming needs to use a plurality of beams pointing to different directions to completely cover a cell. A base station 201 uses eight beams, that is, a beam t1 to a beam t8, to cover a cell served by the base station 201. In a downlink process, the base station 201 performs beam sweeping, and sequentially transmits a radio signal by using the beams pointing to different directions. For example, in a beam sweeping step 21 shown in FIG. 2, the base station 201 sequentially transmits a radio signal by using the beam t1 to the beam t8. In addition, the user terminal performs beam measurement, to measure radio signals transmitted by different transmit beams of the base station, and sends a beam report to the base station to report a related beam measurement result. For example, FIG. 2 shows step 22 and step 23. In step 22, a user terminal 202 sends a beam report to the base station 201, and in step 23, a user terminal 203 sends a beam report to the base station 201. The base station determines, based on the beam reports reported by the user terminals, optimal transmit beams (beam determination) aligned with the user terminals. In addition, because an antenna array is also configured for the user terminal, for example, in FIG. 2, the user terminal 202 and the user terminal 203 each use four beams, that is, a beam r1 to a beam r4, both of a transmit beam and a receive beam need to be considered in a beam alignment process. The 5G wireless communication network allows the user terminal to change a corresponding receive beam for a transmit beam, change a mapping relationship between the transmit beam and the receive beam of the user terminal, determine and select an optimal receive beam, and generate a pair of optimal mapping relationship between the transmit beam and the receive beam based on the foregoing. Refer to FIG. 2. A corresponding optimal beam mapping relationship between the user terminal 202 and the base station is (t4, r3), and a corresponding optimal beam mapping relationship between the user terminal 203 and the base station is (t6, r2).

However, because a narrower beam indicates a larger signal gain, a beam generated by a large-scale antenna array usually needs to be very narrow. To ensure that a sufficient signal gain is obtained, a base station is required to use a large quantity of narrow beams to ensure effective coverage for a user in any direction in a cell. In this case, in a current solution in which all narrow beams are traversed and swept to search for an optimal transmit beam by using a related technology, sweeping time is excessively long, and a beamforming speed is excessively low. Consequently, this greatly affects communication quality and deteriorates user experience.

In addition, in a current beamforming technology, a large quantity of phase shifters need to be used in a beam training process. Because a channel needs to be estimated and an estimation result needs to be fed back to a transmit end, the beamforming technology is highly complex to implement, and beam alignment takes long time. In a millimeter-wave heterogeneous network, mobility enhancement technologies such as dual connectivity, cell range expansion, and beamforming are currently introduced in a related technology. This not only fully utilizes a spectrum resource advantage of a millimeter wave, but also effectively resolves a problem of high-speed data transmission under high mobility scenarios. Problems of inter-cell handover and network configuration in the millimeter-wave heterogeneous network can be preliminarily resolved by using a dual connectivity technology. However, a problem of load imbalance still cannot be effectively resolved. In addition, the dual connectivity technology only supports a heterogeneous network architecture, and has obvious limitations.

To resolve the foregoing problem, an embodiment of this application provides a beam alignment method. The method may be applied to a terminal device and a network device. A conjugate phase processing apparatus in an analog domain may be added on at least one side of a network device side and a terminal device side, and the apparatus can construct an array system with a reverse function. The method includes the following steps. A conjugate phase processing apparatus of the transmit device may calculate, based on a direction of arrival of a signal of the receive device, a conjugate phase corresponding to the signal, so that the transmit device determines, based on the conjugate phase, a narrow beam whose direction of arrival is opposite to the direction of arrival as a target transmit beam aligned between the transmit device and the receive device. In addition, the receive device reports, to the transmit device, a target receive beam determined through local sweeping, so that the receive device and the transmit device complete beam alignment, a communication link is established based on the target receive beam of the receive device and the target transmit beam of the transmit device for communication. It should be noted that, in this embodiment of this application, when the transmit device is a network device, the receive device is a terminal device; or when the transmit device is a terminal device, the receive device is a network device.

Figure 3:
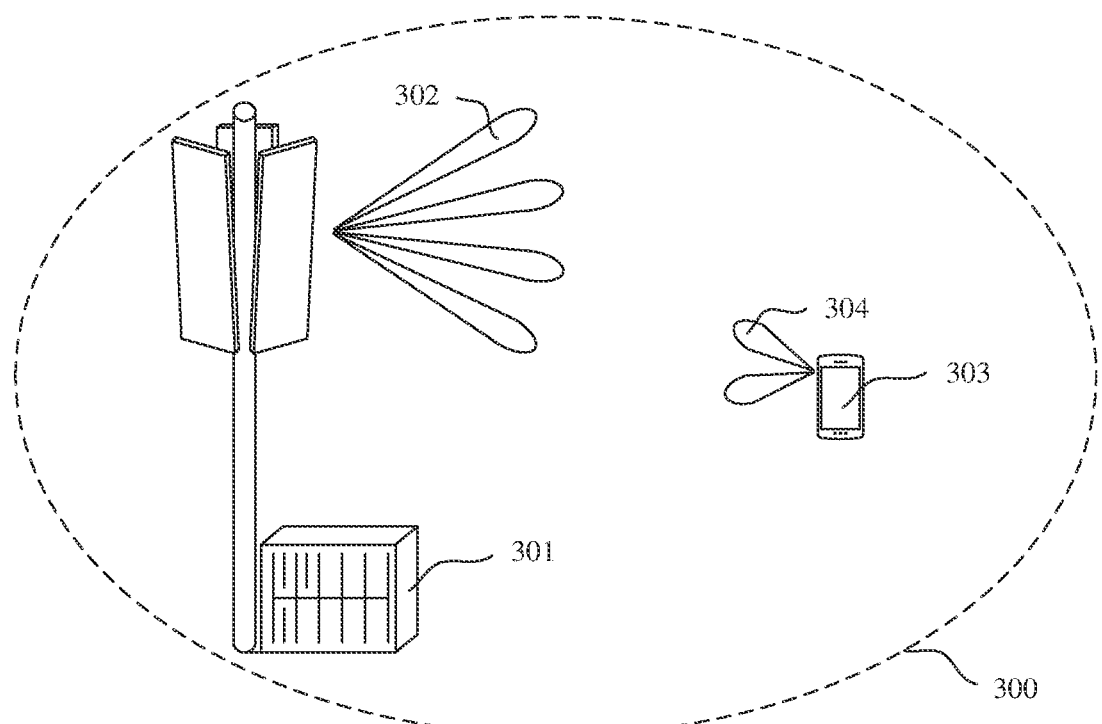
FIG. 3 is a schematic diagram of an architecture of a communication system according to an embodiment of this application.

The beam alignment method provided in this embodiment of this application may be applied to a communication system 300 in which two communication devices establish a beam pair link through beam training for communication. As shown in FIG. 3, the communication system 300 includes at least one or more network devices 301 and one or more terminal devices 303. The network device 301 and the terminal device 303 separately determine matched uplink and downlink beams from a beam set 302 and a beam set 304 through beam training, to establish a beam pair link for communication.

Figure 4A:
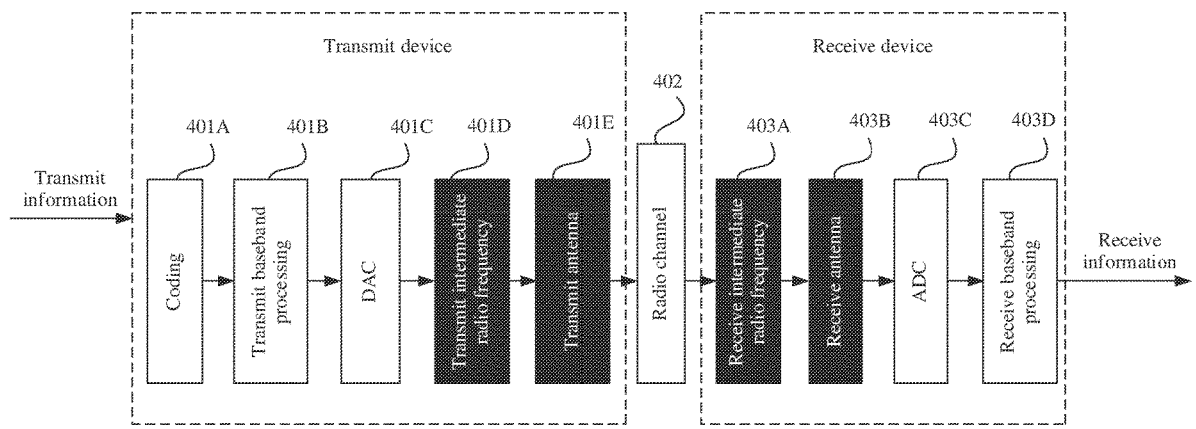
FIG. 4A is a schematic diagram of an architecture of another communication system according to an embodiment of this application.

FIG. 4A is a schematic diagram of a radio communication scenario according to an embodiment of this application. Specifically, FIG. 4A includes a transmit device, a radio channel, and a receive device. It should be noted that, in this embodiment of this application, when the network device is a transmit device, the terminal device is a receive device; or when the terminal device is a transmit device, the network device is a receive device.

The transmit device may include a coding unit 401A, configured to complete functions such as error correction coding and interleaving of an information bit; a transmit baseband processing unit 401B, configured to complete processing such as modulation, framing, filter shaping, and predistortion correction of information; a digital-to-analog converter (DAC) 401C, configured to complete digital-to-analog conversion of information; a transmit intermediate radio frequency 401D, configured to: modulate a baseband signal to a radio frequency signal, and filter a signal; and a transmit antenna 401E, configured to radiate electromagnetic wave energy in the air. When the conjugate phase processing apparatus is added on a transmit device side, the conjugate phase processing apparatus added on the transmit device side may be integrated into the transmit intermediate radio frequency 401D and the transmit antenna 401E.

A radio channel 402 is used for radio transmission of an electromagnetic wave in a medium such as atmosphere, vacuum, or water.

The receive device includes a receive intermediate radio frequency 403A, configured to down-convert a received radio frequency signal to a low frequency or a baseband; a receive antenna 403B, configured to receive an electromagnetic wave signal in the air; an analog-to-digital converter (ADC) 403C, configured to complete analog-to-digital conversion of information; and a receive baseband processing unit 403D, configured to complete restoration of a received baseband signal, including units such as a synchronization unit, an equalization unit, and a decoding unit. When the conjugate phase processing apparatus is added on a receive device side, the conjugate phase processing apparatus added on the receive device side may be integrated into the receive intermediate radio frequency 403A and the receive antenna 403B.

Figure 4B:
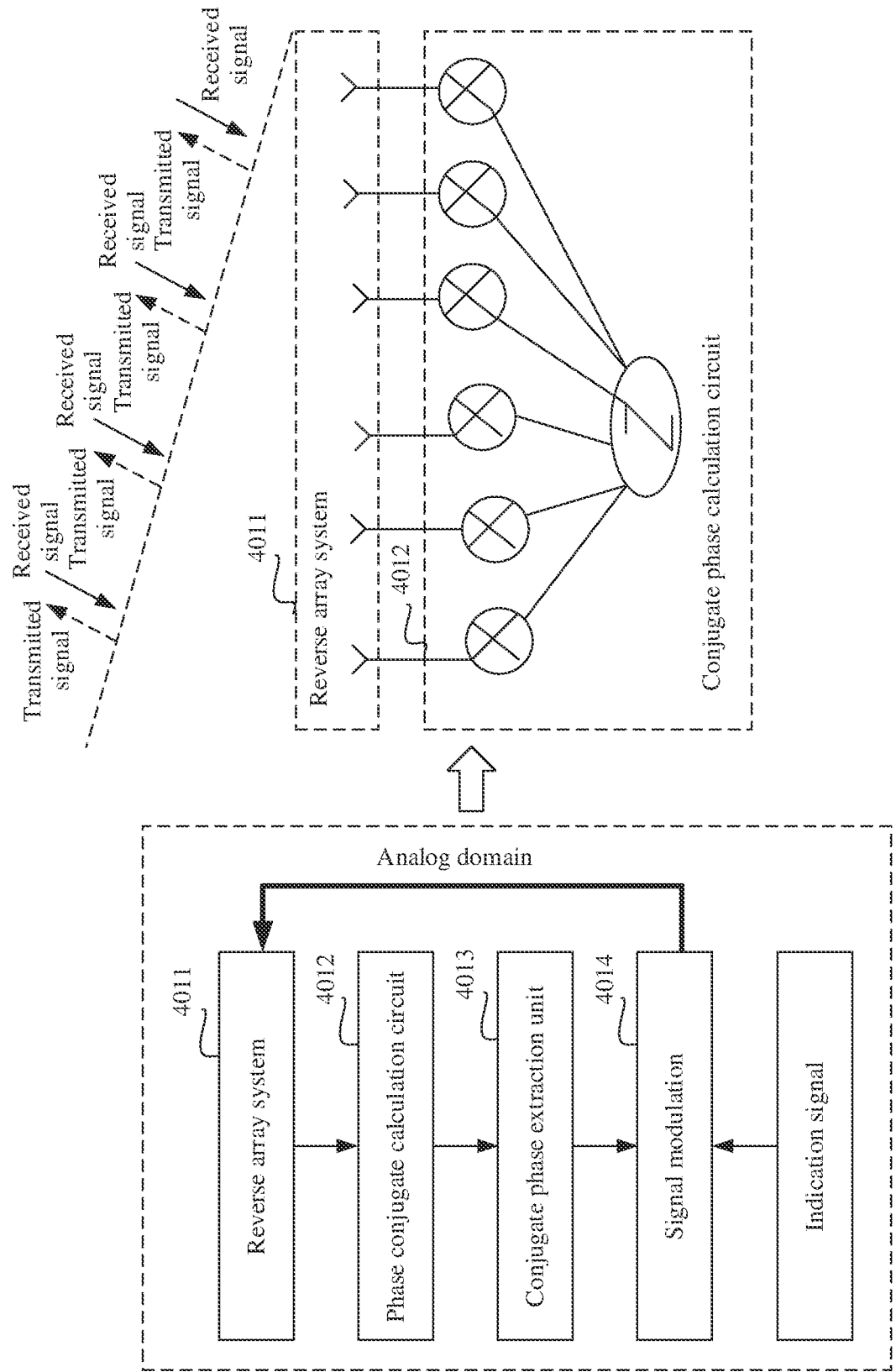
FIG. 4B is a schematic diagram of an architecture of a conjugate phase processing apparatus according to an embodiment of this application.

As shown in FIG. 4B, the conjugate phase processing apparatus added on the transmit device side may include a reverse array system 4011, a phase conjugate calculation circuit 4012, a conjugate phase extraction unit 4013, and a signal modulation unit 4014. The reverse array system 4011 may be integrated into the transmit antenna or the receive antenna shown in FIG. 4A, and is configured to receive electromagnetic wave signals (received signals shown in FIG. 4B) in the air, or transmit signals in a direction opposite to a direction of arrival of the received signals. The phase conjugate calculation circuit 4012 is configured to calculate a conjugate phase of a received signal. The phase conjugate calculation circuit 4012 may implement in an analogy domain, by using a radio frequency mixing manner, that when a local frequency is twice a radio frequency, an output intermediate frequency is equal to the radio frequency, but a phase of the intermediate frequency is opposite to a phase of an input radio frequency, so that phase conjugate can be implemented. The conjugate phase extraction unit 4013 is configured to extract an output phase after conjugate phase calculation is completed. The signal modulation unit 4014 is configured to modulate a radio signal to be sent to the receive device side to a current conjugate phase and send the radio signal to the receive device side.

A communication system to which this application is applied may be various communication systems, for example, may be the Internet of Things (IoT), a narrow band Internet of Things (NB-IoT), Long Term Evolution (LTE), a fifth generation (5G) communication system, a hybrid architecture of LTE and 5G, a 5G NR system, a new communication system emerging in future communication development, or the like. The 5G communication system described in this application may include at least one of a non-standalone (NSA) 5G communication system or a standalone (SA) 5G communication system. The communication system may also be a public land mobile network (PLMN), a device-to-device (D2D) network, a machine-to-machine (M2M) network, or another network.

The terminal device in embodiments of this application is a user-side entity configured to receive or transmit a signal. The terminal device may be a device that provides voice and data connectivity for a user, for example, a handheld device or a vehicle-mounted device having a wireless connection function. The terminal device may alternatively be another processing device connected to a wireless modem. The terminal device may communicate with one or more core networks by using a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device, user equipment, or the like. The terminal device may be a mobile terminal, for example, a mobile phone (or referred to as a "cellular" phone) and a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, embodiments of this application are not limited thereto. The terminal device in embodiments of this application may alternatively be a terminal device or the like that appears in a future evolved PLMN. This is not limited in embodiments of this application.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data of a network device, sending an electromagnetic wave, and transmitting uplink data to the network device.

The network device in embodiments of this application is a network-side entity configured to transmit or receive a signal. The network device in embodiments of this application may be a device in a wireless network, for example, a RAN node that connects the terminal to the wireless network. For example, the network device may be an evolved NodeB (evolutional NodeB, eNB or e-NodeB) in LTE, a new radio controller (NR controller), a gNodeB (gNB) in a 5G system, a centralized unit (CU), a new radio base station, a remote radio module, a micro base station, a relay, a distributed unit (DU), a home base station, a transmission reception point (TRP), a transmission point (TP), or any other wireless access device. This is not limited in embodiments of this application. The network device may cover one or more cells.

It should be noted that, with continuous development of technologies, the terms in embodiments of this application may change, but all of the terms shall fall within the protection scope of this application.

To make the objectives, technical solution, and advantages of embodiments of this application clearer, the following further describes embodiments of this application in detail with reference to the accompanying drawings.

The network architecture and the service scenario described in embodiments of this application are intended to describe the technical solutions in embodiments of this application more clearly, and do not constitute a limitation on the technical solutions provided in embodiments of this application. A person of ordinary skill in the art may learn that, with evolution of the network architecture and emergence of a new service scenario, the technical solutions provided in embodiments of this application are also applicable to similar technical problems.

Based on the foregoing analysis, the following specific embodiments are provided. A beam alignment process provided in following embodiments of this application is used to constrain beam sweeping behavior of a base station and a terminal, to improve precision and a speed of narrow beam alignment. The method and the apparatus are based on a same technical idea. Because a problem-resolving principle of the method is similar to a problem-resolving principle of the apparatus, mutual reference may be made to implementation of the apparatus and the method. Repeated parts are not described in detail.

Figure 5:
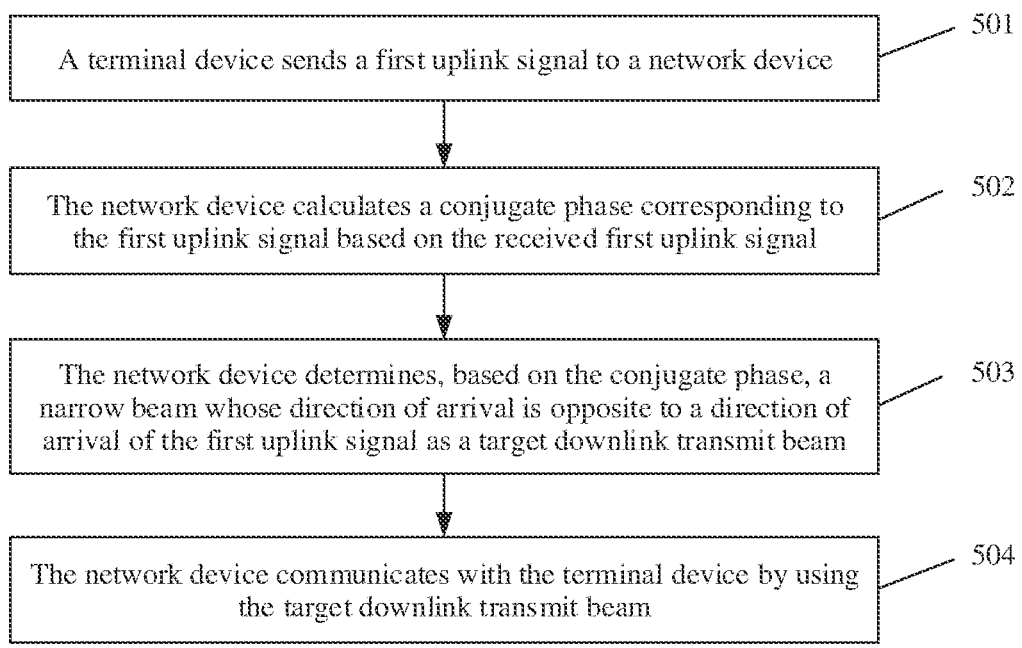
FIG. 5 is a schematic flowchart of a beam alignment method according to an embodiment of this application.

FIG. 5 is a beam alignment process according to an embodiment of this application.

Step 501: A terminal device sends a first uplink signal to a network device. The first uplink signal may include uplink data information or system information.

Step 502: The network device calculates, based on the received first uplink signal, a conjugate phase corresponding to the first uplink signal.

Specifically, a conjugate phase processing apparatus of the network device may calculate, based on a direction of arrival of the first uplink signal, the conjugate phase corresponding to the first uplink signal.

Step 503: The network device determines, as a target downlink transmit beam based on the conjugate phase, a narrow beam whose direction of arrival is opposite to the direction of arrival of the first uplink signal. A direction of the target downlink transmit beam is opposite to the direction of arrival of the first uplink signal.

Step 504: The network device communicates with the terminal device by using the target downlink transmit beam.

In a possible embodiment, before the network device performs step 501, the network device transmits a radio signal to the terminal device by using fixed wide beams pointing to different directions, where a set of directions of the fixed wide beams pointing to different directions may cover a signal coverage area of the network device. To be specific, the network device performs a beam sweeping process. The terminal device may determine, based on a beam sweeping result, a narrow beam with maximum receive power as a target receive beam, and report a second uplink signal to the network device. The second uplink signal includes a measurement result (for example, signal receive power) of a target downlink receive beam of the terminal device or an identifier (for example, a beam ID) of the target downlink receive beam of the terminal device. In this way, the network device may determine, based on the second uplink signal, the target downlink receive beam aligned with the target downlink transmit beam, to implement narrow beam alignment.

In a possible embodiment, when the terminal device moves, the network device may further perform beam tracking. To be specific, the network device determines, based on a third uplink signal from the terminal device, to calculate a conjugate phase corresponding to the third uplink signal, so that the network device adjusts, based on the conjugate phase corresponding to the third uplink signal, a target beam to a narrow beam whose direction of arrival is opposite to a direction of arrival of the third uplink signal. In this way, the network device can automatically adjust a transmit direction of a radio signal to point to a direction of arrival without parsing specific content of the received signal. Therefore, a sweeping procedure is simplified, and narrow beam alignment and beam tracking are completed.

It should be further understood that before the foregoing steps are performed in this embodiment of this application, the terminal device registers with the network device in an initial access process, and the network device learns an identifier (UE ID) and location information (a direction angle and coordinates of the terminal device) of the terminal device.

Figure 6:
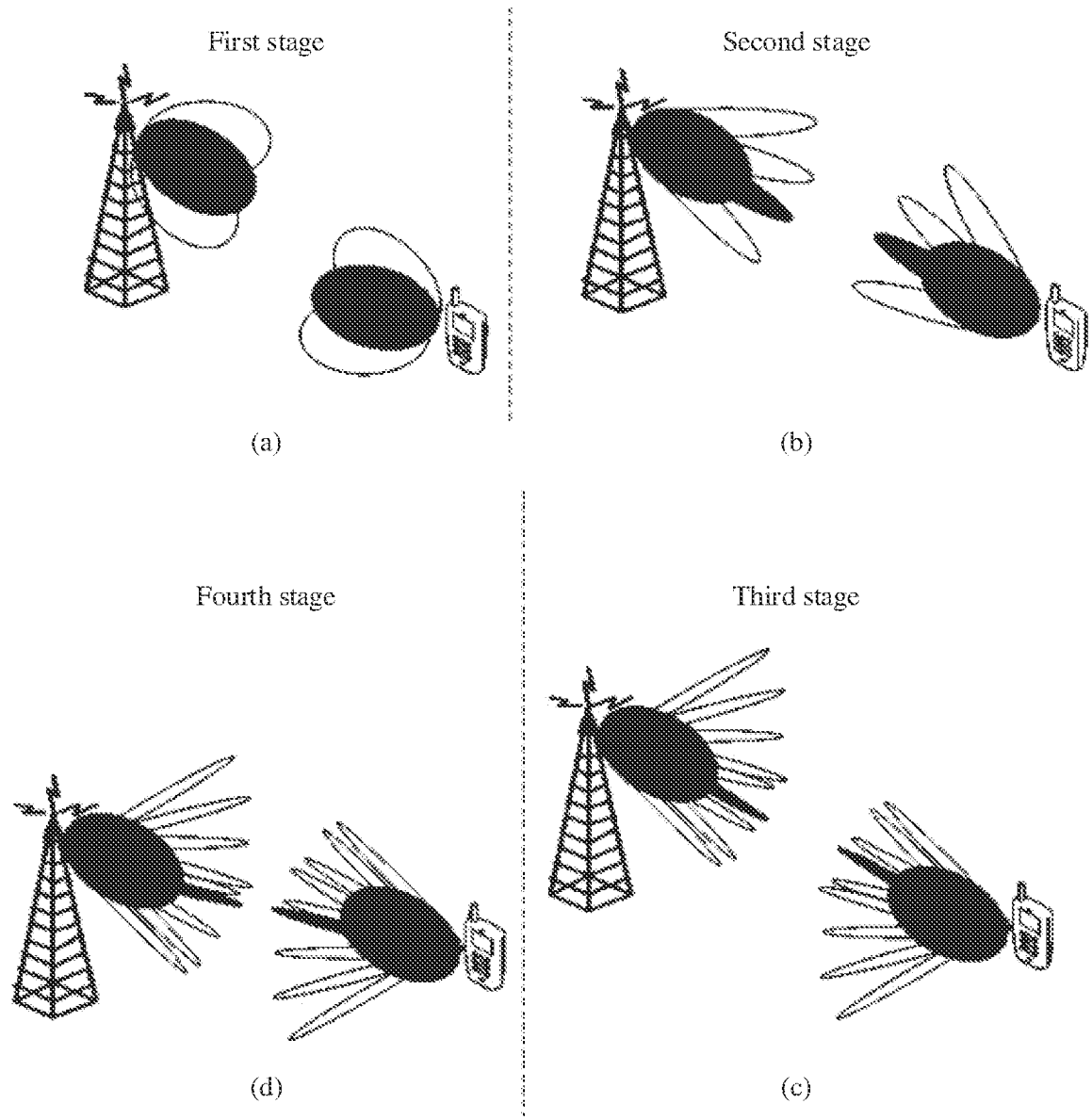
FIG. 6 is a schematic diagram of a principle of beam alignment according to an embodiment of this application.

FIG. 6 is an example of a staged beam alignment method between a base station and UE. A downlink beam training process includes the following steps.

(1) A coarse sweeping process in a first stage: As shown in (a) in FIG. 6, the base station uses a small quantity of wide beams to cover an entire cell, and the UE in the cell determines a current optimal receive wide beam in a receive beam sweeping manner. For example, a beam with maximum receive power is determined as the optimal receive wide beam. The UE determines the optimal receive wide beam as an initial central receive beam in a second stage.

(2) A fine sweeping process in the second stage: As shown in (b) in FIG. 6, the UE performs narrow beam sweeping based on the initial central receive beam determined in the first stage, and the UE performs measurement and reports, to a base station side, a measurement result corresponding to the optimal receive beam, for example, RSRP. After a conjugate processing apparatus on the base station side detects a received signal of the UE, the conjugate processing apparatus on the base station side calculates a conjugate phase of the received signal in real time, and determines a narrow beam whose direction of arrival is opposite to a direction of arrival of the received signal as a transmit beam on the base station side. The base station side uses the transmit beam to modulate a radio signal to be sent to the UE to a current conjugate phase and sends the radio signal to the UE. The transmit beam on the base station side is aligned with the receive beam on a UE side.

It can be learned from the figure that a width of a receive beam determined by the UE in the second stage is smaller than a width of a receive beam determined in the first stage.

(3) A fine alignment process in a third stage: As shown in (c) in FIG. 6, the UE side adjusts convergence toward an optimal narrow beam. When the optimal narrow beam is converged, the UE feeds back an optimal narrow beam ID to the base station side. The base station automatically calculates a conjugate phase in real time based on a transmit signal from the UE side, and determines a transmit beam corresponding to the conjugate phase. In this case, the UE and the base station complete fine alignment of the narrow beam.

(4) A beam tracking process in a fourth stage: As shown in (d) in FIG. 6, when the UE moves, the base station calculates a conjugate phase of a received uplink signal in real time based on the received uplink signal from the UE, and determines a narrow beam whose direction of arrival is opposite to a direction of arrival of the uplink signal as a transmit beam on the base station side. The base station side modulates, by using the transmit beam, a radio signal to be sent to the UE to a current conjugate phase and sends the radio signal to the UE. To be specific, the base station automatically tracks a beam direction change of the UE based on the transmit beam determined in the second stage or the third stage, so that the transmit beam of the base station is always reverse to a direction of arrival of a received signal of the UE.

Figure 7:
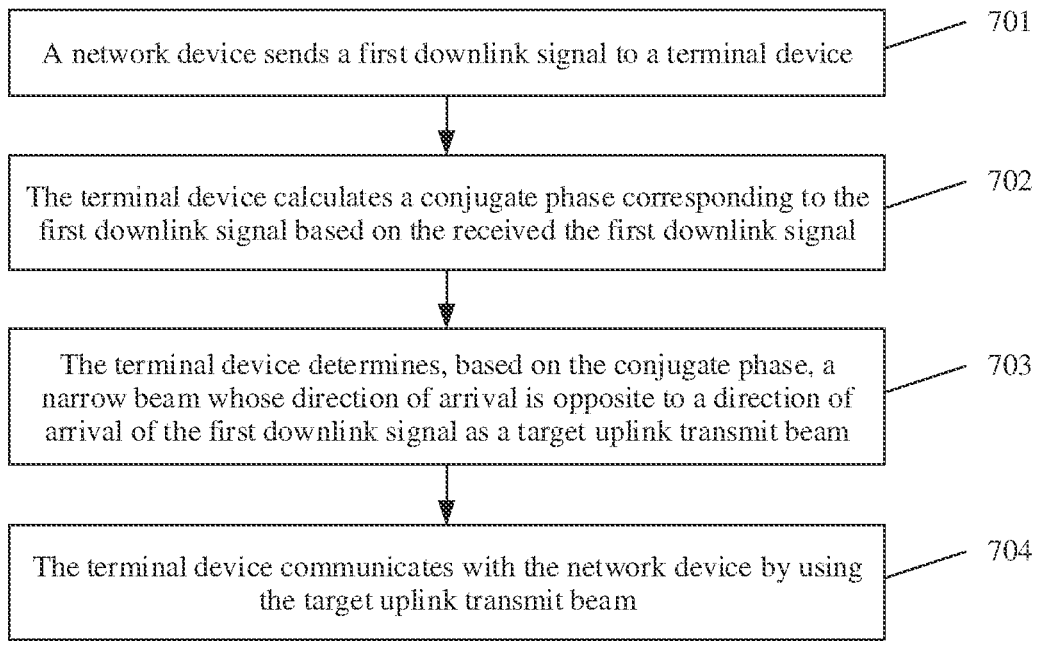
FIG. 7 is a schematic flowchart of a beam alignment method according to an embodiment of this application.

FIG. 7 is a beam alignment process according to an embodiment of this application.

Step 701: A network device sends a first downlink signal to a terminal device. The first downlink signal may include downlink data information or system information.

Step 702: The terminal device calculates, based on the received first downlink signal, a conjugate phase corresponding to the first downlink signal.

Specifically, a conjugate phase processing apparatus of the terminal device calculates, based on a direction of arrival of the first downlink signal, the conjugate phase corresponding to the first downlink signal.

Step 703: The terminal device determines, based on the conjugate phase, a narrow beam whose direction of arrival is opposite to the direction of arrival of the first downlink signal as a target uplink transmit beam.

A direction of the target uplink transmit beam is opposite to the direction of arrival of the first downlink signal.

Step 704: The terminal device communicates with the network device by using the target uplink transmit beam.

In a possible embodiment, before the terminal device performs step 701, the terminal device transmits a radio signal to the network device by using fixed wide beams pointing to different directions, where a set of directions of the fixed wide beams pointing to different directions may cover a signal coverage area of the network device. To be specific, the terminal device performs a beam sweeping process. The network device may determine, based on a beam sweeping result, a narrow beam with maximum receive power as a target receive beam, and report a second downlink signal to the terminal device. The second downlink signal includes a measurement result (for example, signal receive power) of a target uplink receive beam of the network device, or an identifier (for example, a beam ID) of the target uplink receive beam of the network device. In this way, the terminal device may determine, based on the second downlink signal, the target uplink receive beam aligned with the target uplink transmit beam, to implement narrow beam alignment.

In a possible embodiment, when the terminal device moves, the terminal device may further perform beam tracking. To be specific, the terminal device determines, based on a third downlink signal from the network device, to calculate a conjugate phase corresponding to the third downlink signal, so that the terminal device adjusts, based on the conjugate phase corresponding to the third downlink signal, a target beam to a narrow beam whose direction of arrival is opposite a direction of arrival of the third downlink signal. In this way, the terminal device can automatically adjust a transmit direction of a radio signal to point to a direction of arrival without parsing specific content of the received signal. Therefore, a sweeping procedure is simplified, and narrow beam alignment and beam tracking are completed.

It should be further understood that before the foregoing steps are performed in this embodiment of this application, the terminal device registers with the network device in an initial access process, and the network device learns an identifier (UE ID) and location information (a direction angle and coordinates of the terminal device) of the terminal device.

The following shows an example of a staged beam alignment method between a base station and UE. An uplink beam training process is similar to a downlink beam training process. For the uplink beam training process, the following steps are included.

(1) A coarse sweeping process in a first stage: As shown in (a) in FIG. 6, the UE uses a small quantity of wide beams to cover an entire cell, the base station determines a current optimal receive wide beam in a receive beam sweeping manner. For example, a beam with maximum receive power is determined as the optimal receive wide beam. The base station determines the optimal receive wide beam as an initial central receive beam in a second stage.

(2) A fine sweeping process in the second stage: As shown in (b) in FIG. 6, the base station performs narrow beam sweeping based on the initial central receive beam determined in the first stage, and the base station performs measurement and reports, to a UE side, a measurement result corresponding to the optimal receive beam, for example, RSRP. After a conjugate processing apparatus on the UE side detects a received signal of the base station, the conjugate processing apparatus on the UE side calculates a conjugate phase of the received signal in real time, and determines a narrow beam whose direction of arrival is opposite to a direction of arrival of the received signal as a transmit beam on the UE side. The UE side uses the transmit beam to modulate a radio signal to be sent to the base station to a current conjugate phase and sends the radio signal to the base station. The receive beam on a base station side is aligned with the transmit beam on the UE side.

It can be learned from the figure that a width of a receive beam determined by the base station in the second stage is smaller than a width of a receive beam determined in the first stage.

(3) A fine alignment process in a third stage: As shown in (c) in FIG. 6, the base station side adjusts convergence toward an optimal narrow beam. When the optimal narrow beam is converged, the base station feeds back an optimal narrow beam ID to the UE side. The UE automatically calculates a conjugate phase in real time based on a transmit signal from the base station side, and determines a transmit beam corresponding to the conjugate phase. In this case, the UE and the base station complete fine alignment of the narrow beam.

(4) A beam tracking process in a fourth stage: As shown in (d) in FIG. 6, when the UE moves, the UE calculates a conjugate phase of a received signal in real time based on the received downlink signal from the base station, and determines a narrow beam whose direction of arrival is opposite to a direction of arrival of the received signal as a transmit beam on the UE side. The UE side modulates, by using the transmit beam, a radio signal to be sent to the base station to a current conjugate phase and sends the radio signal to the base station. To be specific, the UE completes automatic alignment with a beam of the base station based on the transmit beam determined in the second stage or the third stage, so that the transmit beam of the UE is always reverse to a direction of arrival of a received signal of the base station.

Figure 8:
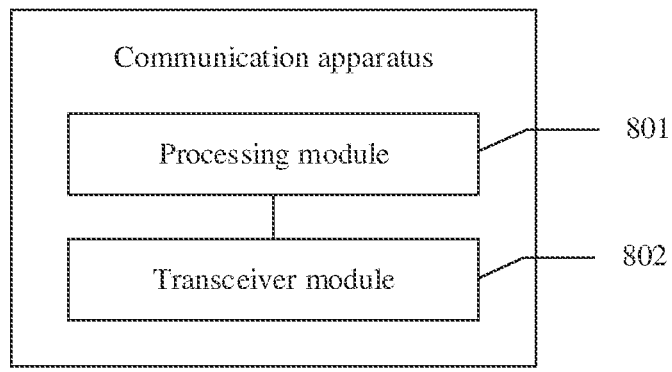
FIG. 8 is a schematic diagram of a structure of a communication apparatus according to an embodiment of this application.

Based on a same technical idea as the method embodiment shown in FIG. 5, an embodiment of this application provides a communication apparatus. A structure of the communication apparatus may be shown in FIG. 8, and includes a processing module 801 and a transceiver module 802.

In an implementation, the communication apparatus may be specifically configured to implement the method performed by the network device in the embodiment in FIG. 5. The apparatus may be a network device, or may be a chip, a chip set, or a part of a chip in the network device that is configured to perform a related method function. The transceiver module 802 is configured to receive a first uplink signal from a terminal device. The processing module 801 is configured to: calculate a conjugate phase corresponding to the first uplink signal, and determine, based on the conjugate phase, a narrow beam whose direction of arrival is opposite to a direction of arrival of the first uplink signal as a target downlink transmit beam aligned between the network device and the terminal device. The transceiver module 802 is further configured to communicate with the terminal device by using the target downlink transmit beam.

In some embodiments, the transceiver module 802 is further configured to receive a second uplink signal from the terminal device, where the second uplink signal includes a measurement result of a target receive beam of the terminal device or an identifier of the target receive beam of the terminal device. The processing module 801 is further configured to determine, based on the second uplink signal, a target downlink receive beam aligned with the target downlink transmit beam.

In some other embodiments, before the transceiver module 802 receives the first uplink signal from the terminal device, the transceiver module 802 is further configured to transmit a radio signal to the terminal device by using fixed wide beams pointing to different directions, where a set of directions of the fixed wide beams pointing to different directions covers a signal coverage area of the network device.

In some embodiments, the processing module 801 includes a conjugate phase processing apparatus, where the conjugate phase processing apparatus can construct an array system with a beam reverse directionality function. The conjugate phase processing apparatus is configured to calculate, based on the direction of arrival of the first uplink signal, the conjugate phase corresponding to the first uplink signal.

In some other embodiments, after the transceiver module 802 communicates with the terminal device by using the target beam, the processing module 801 is further configured to: calculate, based on a third uplink signal from the terminal device, a conjugate phase corresponding to the third uplink signal; and adjust, based on the conjugate phase corresponding to the third uplink signal, the target downlink transmit beam to a narrow beam whose direction of arrival is opposite to a direction of arrival of the third uplink signal.

In an implementation, the communication apparatus may be specifically configured to implement the method performed by the terminal device in the embodiment in FIG. 7. The apparatus may be a terminal device, or may be a chip, a chipset, or a part of a chip in the terminal device that is configured to perform a related method function. The transceiver module 802 is configured to receive a first downlink signal from a network device. The processing module 801 is configured to: calculate a conjugate phase corresponding to the first downlink signal, and determine, based on the conjugate phase, a narrow beam whose direction of arrival is opposite to a direction of arrival of the first downlink signal as a target uplink transmit beam of the terminal device. The receiving module 802 is further configured to communicate with the network device by using the target uplink transmit beam.

In some embodiments, the transceiver module 802 is further configured to receive a second downlink signal from the network device, where the second downlink signal includes a measurement result of a target receive beam of the network device or an identifier of the target receive beam of the network device. The processing module 801 is further configured to determine, based on the second downlink signal, a target uplink receive beam aligned with the target uplink transmit beam.

In some embodiments, before the transceiver module 802 receives the first downlink signal from the terminal device, the transceiver module 802 is further configured to transmit a radio signal to the network device by using fixed wide beams pointing to different directions, where a set of directions of the fixed wide beams pointing to different directions covers a signal coverage area of the network device.

In some embodiments, the processing module 801 includes a conjugate phase processing apparatus, where the conjugate phase processing apparatus can construct an array system with a beam reverse directionality function. The conjugate phase processing apparatus is configured to calculate, based on the direction of arrival of the first downlink signal, the conjugate phase corresponding to a reference signal.

In some other embodiments, after the transceiver module 802 communicates with the terminal device by using the target beam, the processing module 801 is further configured to: calculate, based on a third downlink signal from the network device, a conjugate phase corresponding to the third downlink signal; and adjust, based on the conjugate phase corresponding to the third downlink signal, the target uplink transmit beam to a narrow beam whose direction of arrival is opposite to a direction of arrival of the third downlink signal.

Division into the modules in embodiments of this application is an example, is merely logical function division, and may be other division in an actual implementation. In addition, functional modules in embodiments of this application may be integrated into one processor, each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 9:
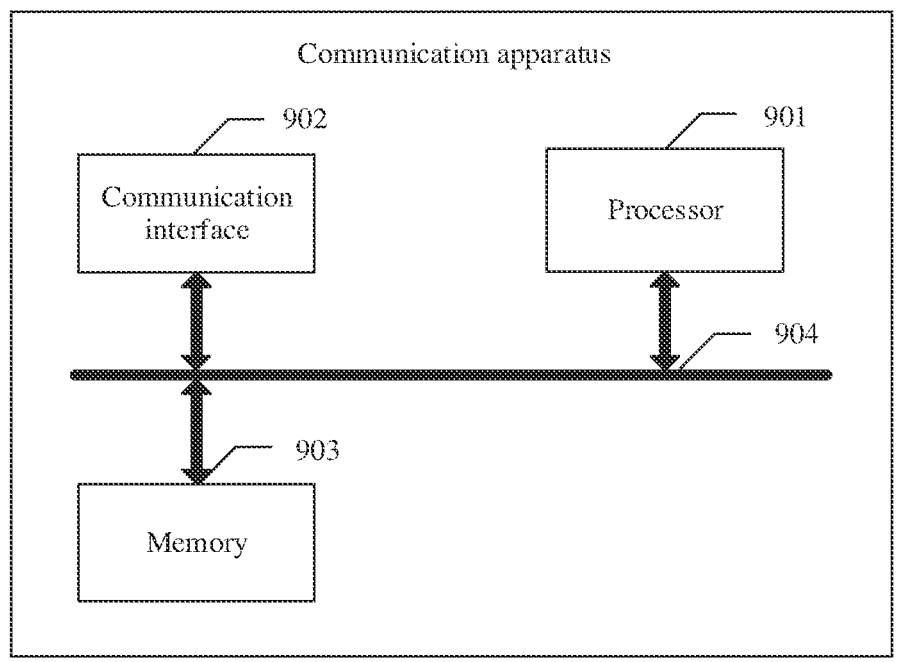
FIG. 9 is a schematic diagram of a structure of another communication apparatus according to an embodiment of this application.

In a possible implementation, the communication apparatus may be shown in FIG. 9. The communication apparatus may be a communication device or a chip in a communication device. The communication device may be a terminal device, or may be a network device. The apparatus may include a processor 901, a communication interface 902, and a memory 903. The processing module 801 may be the processor 901. The transceiver module 802 may be the communication interface 902.

The processor 901 may be a central processing module (CPU), a digital processing module, or the like. The communication interface 902 may be a transceiver, an interface circuit such as a transceiver circuit, a transceiver chip, or the like. The apparatus further includes a memory 903, configured to store a program executed by the processor 901. The memory 903 may be a non-volatile memory, for example, a hard disk (HDD) or a solid-state drive (SSD), or may be a volatile memory, for example, a random-access memory (RAM). The memory 903 is any other medium that can be configured to carry or store expected program code in a form of instructions or a data structure and that can be accessed by a computer, but is not limited thereto.

The processor 901 is configured to execute the program code stored in the memory 903, and is specifically configured to perform an action of the processing module 801. Details are not described herein again in this application. The communication interface 902 is specifically configured to perform an action of the transceiver module 802. Details are not described herein in this application.

A specific connection medium between the communication interface 902, the processor 901, and the memory 903 is not limited in this embodiment of this application. In this embodiment of this application, the memory 903, the processor 901, and the communication interface 902 are connected through a bus 904 in FIG. 9, and the bus is represented by a thick line in FIG. 9. A connection manner between other components is merely schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

An embodiment of the present invention further provides a computer-readable storage medium, configured to store computer software instructions that need to be executed by the processor. The computer software instructions include a program that needs to be executed by the processor.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that instructions executed by a computer or the processor of the another programmable data processing device generate an apparatus for implementing a specific function in one or more processes in the flowcharts and/or in one or more blocks in the block diagrams.

The computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   receiving, by a terminal device, a first downlink signal from a network device;
   calculating, by a conjugate phase processing circuit of the terminal device, a conjugate phase of the first downlink signal, the conjugate phase processing circuit implemented in an analog domain;
   determining, by the terminal device based on the conjugate phase, a narrow beam having a direction of arrival that is opposite to a direction of arrival of the first downlink signal to be a target uplink transmit beam of the terminal device; and
   communicating, by the terminal device, with the network device using the target uplink transmit beam.

2. The method according to claim 1, further comprising:
   receiving, by the terminal device, a second downlink signal from the network device, wherein the second downlink signal comprises a measurement result of a target receive beam of the network device or an identifier of the target receive beam of the network device; and
   determining, by the terminal device based on the second downlink signal, a target uplink receive beam aligned with the target uplink transmit beam.

3. The method according to claim 1, further comprising:
   before the receiving, by the terminal device, the first downlink signal from the network device, transmitting, by the terminal device, a radio signal to the network device using fixed wide beams pointing to different directions, wherein a set of directions of the fixed wide beams pointing to different directions covers a signal coverage area of the network device.

4. The method according to claim 1, wherein the calculating the conjugate phase comprises:
   calculating, by the conjugate phase processing circuit of the terminal device based on the direction of arrival of the first downlink signal, a conjugate phase corresponding to a reference signal.

5. The method according to claim 4, wherein the conjugate phase processing circuit is coupled to one or more antennas of the terminal device.

6. The method according to claim 5, wherein the conjugate phase processing circuit comprises a signal modulation circuit, a conjugate phase extraction circuit, a phase conjugate calculation circuit, and a reverse array system that are implemented in the analog domain.

7. The method according to claim 1, further comprising:
after the communicating, by the terminal device, with the network device using the target uplink transmit beam, calculating, by the terminal device based on a third downlink signal from the network device, a conjugate phase corresponding to the third downlink signal; and
adjusting, by the terminal device based on the conjugate phase corresponding to the third downlink signal, the target uplink transmit beam to a narrow beam having a direction of arrival that is opposite to a direction of arrival of the third downlink signal.

8. An apparatus, comprising:
a transceiver, configured to receive a first downlink signal from a network device;
a conjugate phase processing circuit implemented in an analog domain;
at least one processor; and
a non-transitory computer readable storage medium storing a program that is executable by at least one processor, the program including instructions to cause the apparatus to perform:
calculating a conjugate phase of the first downlink signal, and
determining, by the conjugate phase processing circuit based on the conjugate phase, a narrow beam having a direction of arrival that is opposite to a direction of arrival of the first downlink signal to be a target uplink transmit beam of the apparatus, and
wherein the transceiver is further configured to communicate with the network device using the target uplink transmit beam.

9. The apparatus according to claim 8, wherein the transceiver is further configured to receive a second downlink signal from the network device, wherein the second downlink signal comprises a measurement result of a target receive beam of the network device or an identifier of the target receive beam of the network device; and
wherein the program further includes instructions to cause the apparatus to perform:
determining, based on the second downlink signal, a target uplink receive beam aligned with the target uplink transmit beam.

10. The apparatus according to claim 8, wherein the transceiver is further configured to:
before receiving the first downlink signal, transmit a radio signal to the network device using fixed wide beams pointing to different directions, wherein a set of directions of the fixed wide beams pointing to different directions covers a signal coverage area of the network device.

11. The apparatus according to claim 8, wherein the calculating the conjugate phase comprises:
using the conjugate phase processing circuit to calculate, based on the direction of arrival of the first downlink signal, the conjugate phase corresponding to a reference signal.

12. The apparatus according to claim 11, wherein the conjugate phase processing circuit is coupled to one or more antennas of the apparatus.

13. The apparatus according to claim 12, wherein the conjugate phase processing circuit comprises a signal modulation circuit, a conjugate phase extraction circuit, a phase conjugate calculation circuit, and a reverse array system that are implemented in the analog domain.

14. The apparatus according to claim 8, wherein the transceiver is further configured to: after communicating with the network device by using the target uplink transmit beam, receive a third downlink signal from the network device; and
wherein the program further includes instructions to cause the apparatus to perform:
calculating a conjugate phase corresponding to the third downlink signal; and
adjusting, based on the conjugate phase corresponding to the third downlink signal, the target uplink transmit beam to a narrow beam whose direction of arrival is opposite to a direction of arrival of the third downlink signal.

15. A non-transitory computer-readable storage medium, wherein the non-transitory computer-readable storage medium stores instructions, and when the instructions are executed by one or more processors, an apparatus is caused to perform:
receiving a first downlink signal from a network device;
calculating, by a conjugate phase processing circuit of the apparatus, a conjugate phase of the first downlink signal, the conjugate phase processing circuit implemented in an analog domain;
determining, based on the conjugate phase, a narrow beam having a direction of arrival that is opposite to a direction of arrival of the first downlink signal to be a target uplink transmit beam of the apparatus; and
communicating with the network device using the target uplink transmit beam.

16. The non-transitory computer-readable storage medium according to claim 15, wherein when the instructions are executed by the one or more processors, the apparatus is further caused to perform:
receiving a second downlink signal from the network device, wherein the second downlink signal comprises a measurement result of a target receive beam of the network device or an identifier of the target receive beam of the network device; and
determining, based on the second downlink signal, a target uplink receive beam aligned with the target uplink transmit beam.

17. The non-transitory computer-readable storage medium according to claim 15, wherein when the instructions are executed by the one or more processors, the apparatus is further caused to perform:
before the receiving the first downlink signal, transmitting a radio signal to the network device using fixed wide beams pointing to different directions, wherein a set of directions of the fixed wide beams pointing to different directions covers a signal coverage area of the network device.

18. The non-transitory computer-readable storage medium according to claim 15, wherein when the instructions are executed by the one or more processors, the apparatus is further caused to perform:
calculating, based on the direction of arrival of the first downlink signal, a conjugate phase corresponding to a reference signal.

19. The non-transitory computer-readable storage medium according to claim 18, wherein the reference signal is a channel state information reference signal (CSI-RS), a synchronization signal broadcast channel block (SS/PBCH block), a demodulation reference signal (DMRS), a phase tracking reference signal (PTRS), or a tracking reference signal (TRS).

20. The non-transitory computer-readable storage medium according to claim 15, wherein when the instructions are executed by the one or more processors, the apparatus is further caused to perform:
- after the communicating with the network device by using the target uplink transmit beam, receiving a third downlink signal from the network device;
- calculating a conjugate phase corresponding to the third downlink signal; and
- adjusting, based on the conjugate phase corresponding to the third downlink signal, the target uplink transmit beam to a narrow beam whose direction of arrival is opposite to a direction of arrival of the third downlink signal.

\* \* \* \* \*